United States Patent [19]

Soriano

[11] Patent Number: 5,113,699
[45] Date of Patent: May 19, 1992

[54] BARBECUE APPARATUS

[76] Inventor: Eligio L. Soriano, 869 Las Lomas Dr., Milpitas, Calif. 95035

[21] Appl. No.: 738,433

[22] Filed: Jul. 31, 1991

[51] Int. Cl.⁵ .................................... A47J 37/04
[52] U.S. Cl. ................................ 99/421 H; 99/427; 99/449; 99/482; 126/25 R; 126/9 B
[58] Field of Search ............ 99/340, 341, 419, 421 R, 99/421 H, 421 HH, 421 HV, 421 M, 421 V, 427, 449, 482, 450, 393, 401, 339; 126/9 B, 21 A, 25 R, 41 R

[56] References Cited

U.S. PATENT DOCUMENTS

| | | | |
|---|---|---|---|
| 1,666,394 | 4/1928 | Miglin | 99/427 |
| 2,576,028 | 11/1951 | Mitchell | 99/427 |
| 3,447,445 | 6/1969 | Koziol | 99/421 R |
| 3,455,233 | 7/1969 | Cable | 99/443 R |
| 3,943,837 | 3/1976 | Trkla | 99/339 |
| 4,112,832 | 9/1978 | Severdia et al. | 99/421 HH |
| 4,409,452 | 10/1983 | Oouchi et al. | 99/421 H |
| 4,436,024 | 3/1984 | Arden et al. | 99/421 HV |
| 4,442,763 | 4/1984 | Beller | 126/9 B |
| 4,555,986 | 12/1985 | Eisenberg | 99/449 |
| 4,583,452 | 4/1986 | Grosse | 99/450 |
| 4,625,634 | 12/1986 | Kruper | 99/421 H |
| 4,810,856 | 3/1989 | Jovanovic | 99/419 |
| 4,852,476 | 8/1989 | Sanchez . | |

FOREIGN PATENT DOCUMENTS

| | | | |
|---|---|---|---|
| 0332505 | 9/1989 | European Pat. Off. | 99/419 |
| 2522566 | 12/1976 | Fed. Rep. of Germany | 99/421 R |
| 3000653 | 7/1981 | Fed. Rep. of Germany | 99/419 |
| 857216 | 12/1960 | United Kingdom | 99/421 HV |

Primary Examiner—Timothy F. Simone
Attorney, Agent, or Firm—Thomas R. Lampe

[57] ABSTRACT

Barbecue apparatus including a housing, a motor having a rotatable output shaft mounted on the housing, and a support shaft for supporting meat within the housing connected to the output shaft. Mechanical interconnects of a specified character are employed to facilitate installation and removal of the support shaft.

12 Claims, 6 Drawing Sheets

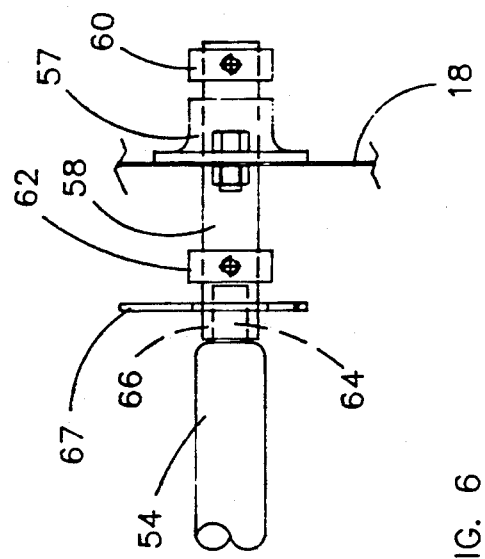
FIG. 6
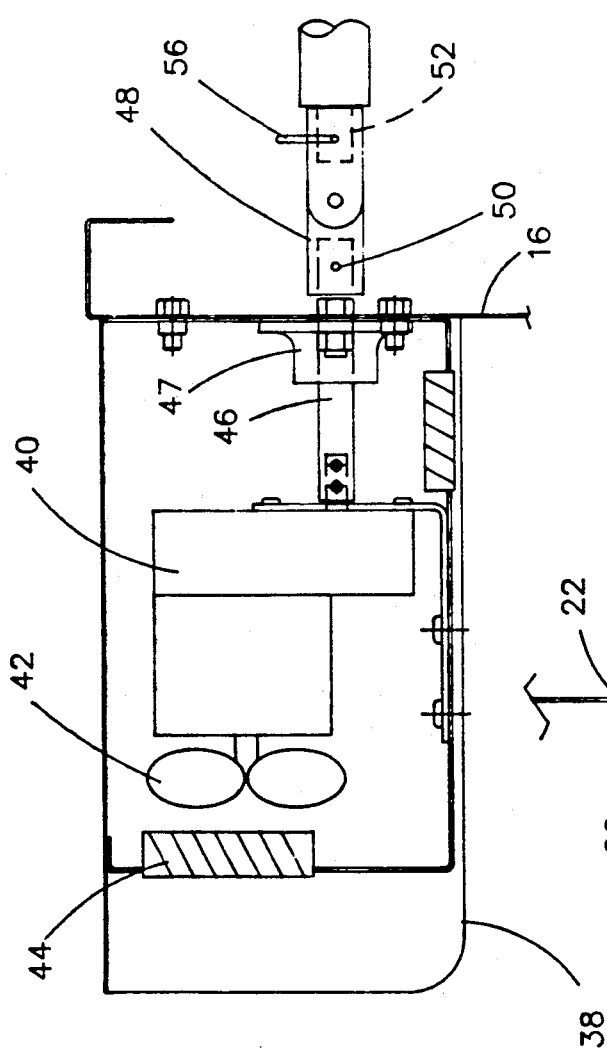
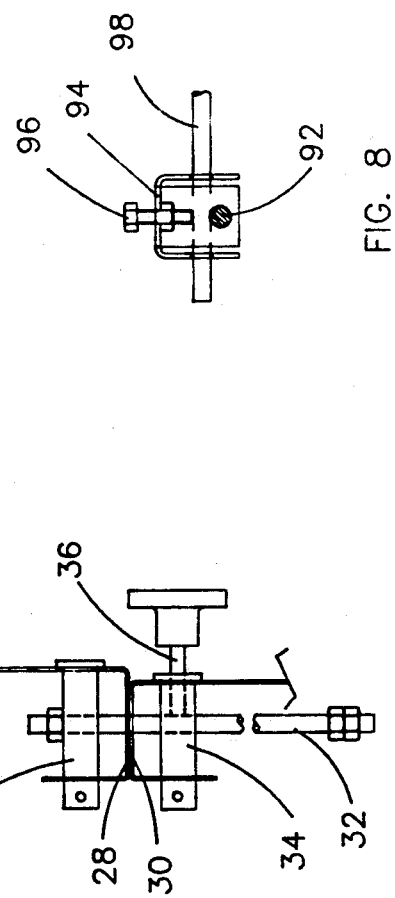
FIG. 8
FIG. 7

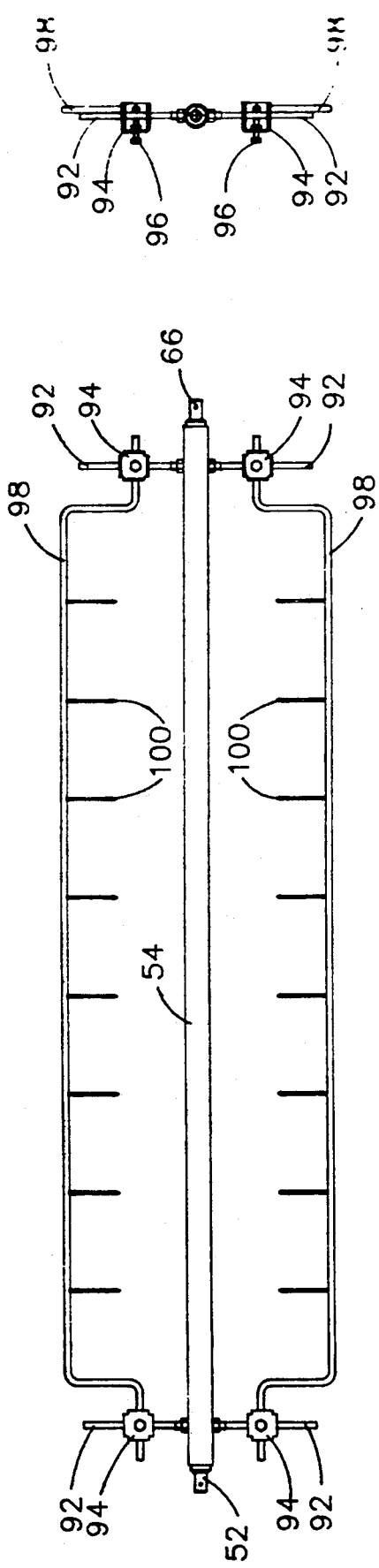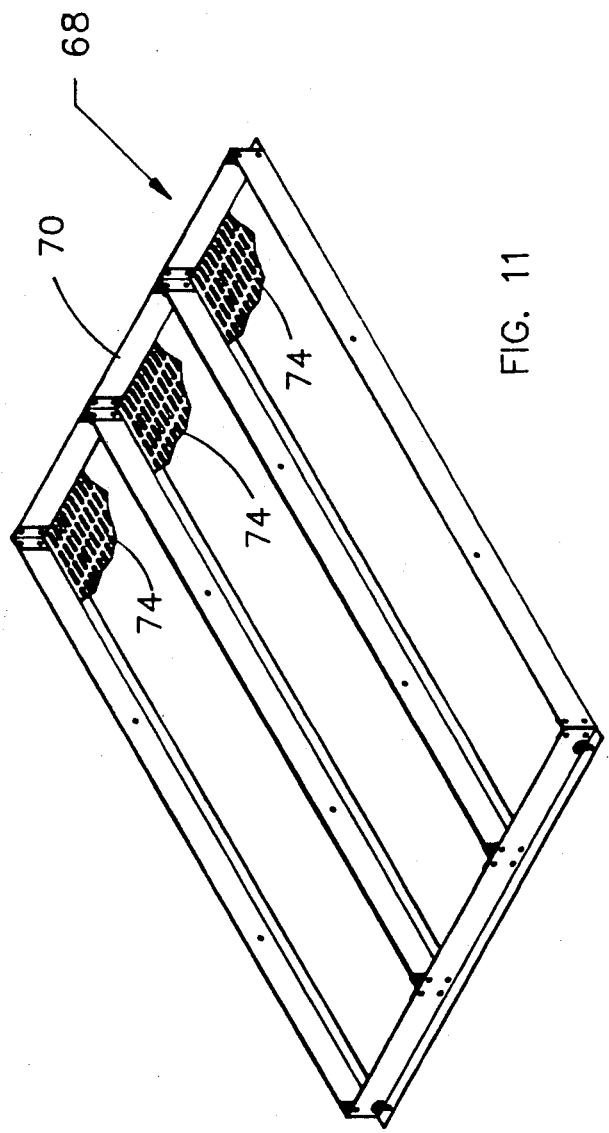

BARBECUE APPARATUS

TECHNICAL FIELD

This invention relates to a barbecue apparatus. The apparatus includes rotisserie structure which facilitates roasting of a whole pig or other large and heavy cut of meat.

BACKGROUND ART

A great many arrangements are known in the prior art for cooking meat. Exemplary of such apparatus are the arrangements shown in U.S. Pat. No. 3,455,233, issued July 15, 1969, U.S. Pat. No. 3,943,837, issued Mar. 16, 1976, and U.S. Pat. No. 4,852,476, issued Aug. 1, 1989.

Many prior art constructions incorporate rotisserie mechanisms which support and rotate meat during roasting thereof. Many such units, however, will not readily accommodate large and heavy pieces of meat such as a whole pig.

DISCLOSURE OF INVENTION

In contrast, the apparatus of the present invention incorporates a number of features which facilitate placement in roasting position of large and heavy pieces of meat in and permitting the selective control of the extent and rate of the cooking process.

The apparatus of the present invention includes a housing defining an interior, the housing including a bottom wall and first and second opposed end walls projecting upwardly from the bottom wall.

Drive means including a motor having a rotatable output shaft is mounted adjacent to the first end wall with the output shaft passing through an aperture formed in the first end wall.

A support shaft having first and second ends extends over the bottom wall for insertion into and to provide support for meat over the bottom wall.

First interconnect means is provided for selectively releasably interconnecting the first support shaft end to the output shaft at a location within the housing above the bottom wall.

Second interconnect means is provided for selectively releasably interconnecting the support shaft second end to the second end wall and retaining the support shaft adjacent to the second end wall above the bottom wall. The second interconnect means includes a bearing mounted on the second end wall, a stud shaft rotatable within and axially slidable relative to the bearing and the support shaft to bring the stud shaft into operative engagement with the support shaft second end, and fastener means for selectively fastening together the support shaft second end and the stub shaft to allow joint rotation thereof.

The apparatus also includes a pillow block bearing affixed to the first end wall at the location of the aperture. The output shaft extends through the pillow block bearing and in engagement therewith to at least partially support the output shaft first end.

The first interconnect means includes a universal joint for accommodating any misalignment between the output shaft and the support shaft as well as fastener means for selectively releasably connecting the universal joint to the support shaft first end.

The apparatus also includes a charcoal rack disposed below the support shaft and above the bottom wall and means for moving the charcoal rack relative to the support shaft and the bottom wall. The charcoal rack moving means comprises a pair of spaced elongated rods disposed above the bottom wall and rotatably mounted relative to the housing and a pair of flexible elements extending downwardly from each elongated rod to the charcoal rack. The flexible elements of each pair of flexible elements diverge away from one another in a downward direction.

Other features, advantages, and objects of the present invention will become apparent with reference to the following description and accompanying drawings.

BRIEF DESCRIPTION OF DRAWINGS

FIG. 6 is an enlarged, somewhat diagrammatic presentation illustrating selected details of the apparatus drive means, support shaft, and related structure;

FIG. 7 is an enlarged, elevation view of a portion of the apparatus cover and cover adjustment means;

FIG. 8 is an enlarged view illustrating details of a portion of the apparatus meat holder elements and adjustment means;

FIGS. 9 and 10 are, respectively, side and end views illustrating details of the apparatus support shaft and cooperable meat holder elements; and FIG. 11 is a perspective view of the apparatus charcoal rack structure.

BEST MODE FOR CARRYING OUT THE INVENTION

Figure 1:
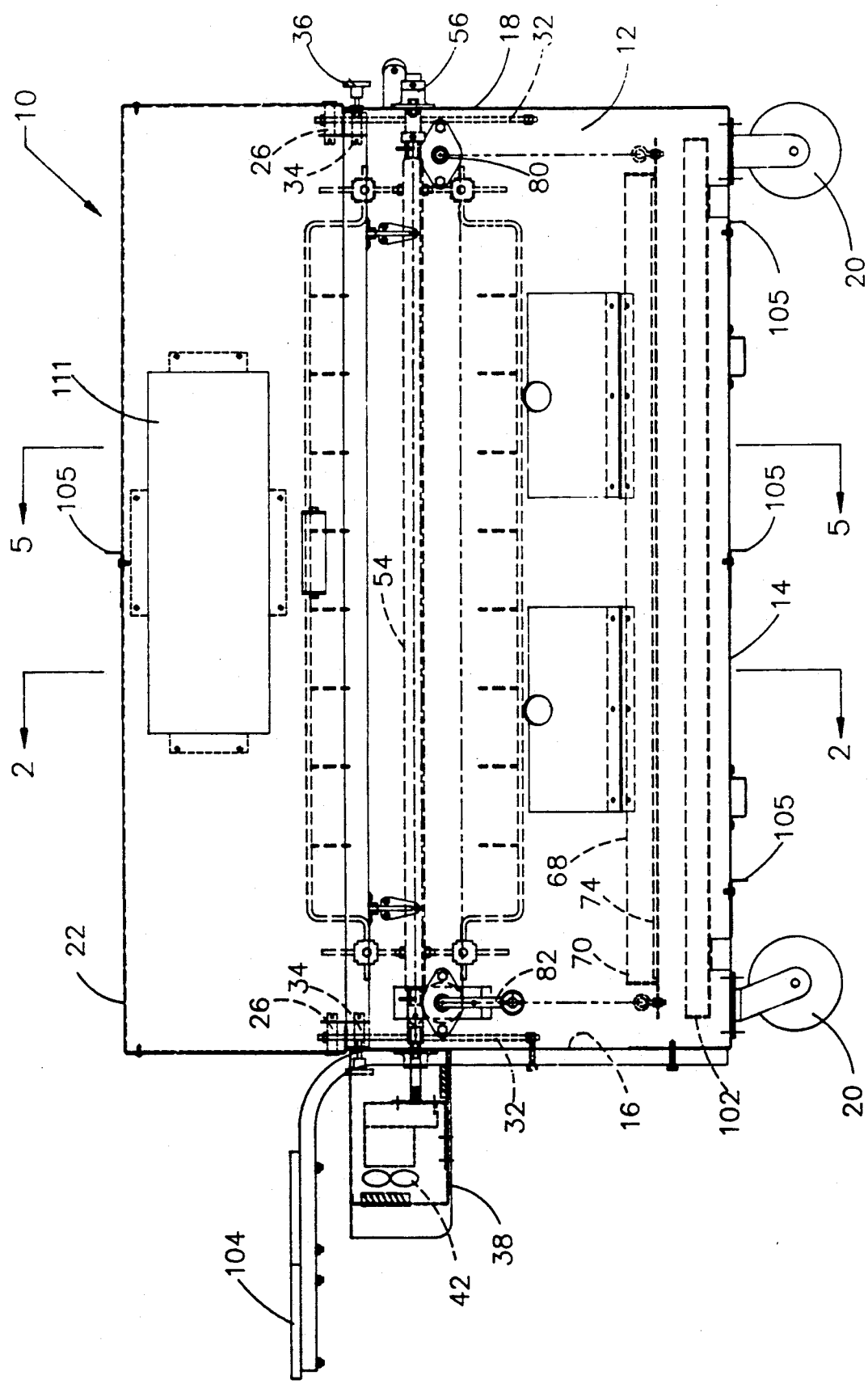
FIG. 1 is a somewhat diagrammatic, frontal elevation view of apparatus constructed in accordance with the teachings of the present invention.

Referring now to the drawings, barbecue apparatus constructed in accordance with the teachings of the present invention is generally designated by reference numeral 10. Apparatus 10 includes a housing 12 defining an interior. Housing 12 includes a bottom wall 14 and a plurality of upstanding walls projecting therefrom, including end walls 16, 18. In the arrangement illustrated, the housing is positioned on wheels 20. However, it is to be understood that the principles of the present invention are applicable to both portable and non-portable barbecues.

A cover 22 is hingeably connected to the housing by hinge means 24. At the front of the cover, at both ends thereof, brackets 26 are affixed (see FIGS. 1 and 7). The brackets 26 are located just above turned-in portions 28 of the cover, the turned-in portions 28 abutting against similar turned-in portions 30 located at the top of the housing when the cover is closed.

Elongated rods 32 are affixed to and depend from brackets 26. The rods 32 pass downwardly though brackets 34 affixed to the housing and are movable in apertures formed therein when the cover is pivoted about its hinges between closed and open positions. The cover is maintained in any desired position between its open and closed positions by a threaded lock member 36 which is threadably engaged with one of the housing end walls. The rods 32 pass through corresponding apertures in brackets 34 and the end of lock member 36 may be screwed into position so that it engages the rod and prevents it from moving.

Affixed to end wall 16 by any suitable expedient such as bolts and nuts is a module 38 incorporating drive means including an electric motor 40. A fan 42 may be operatively associated with the motor, as shown, to pass ventilating air along the motor and through filtered vent 44. From the gear box associated with the motor there projects a rotatable output shaft 46. The output shaft 46 passes through an aperture formed in the end wall 16 as well as through a pillow block bearing 47 having a throughbore in alignment with the aperture. The pillow block bearing prevents any damage which might be caused to the output shaft or to the motor and gear box due to load which would otherwise be imparted thereto by a load shaft (which will be described in detail below) operatively associated therewith and utilized to support a pig or other meat to be roasted.

The distal end of output shaft 46 is received in a recess formed at one end of a universal joint 48 and secured in position relative thereto as by means of a pin 50. The other end of the universal joint 48 receives a projection 52 formed on a support shaft 54. The projection 52 and the universal joint 48 each have throughbores formed therein through which a cotter pin 56 is positioned by the user of the barbecue to maintain an interconnection between the universal joint and the support shaft. The support shaft 54, when in operative position, extends essentially the full length of the housing and over bottom wall 14. The support shaft is for insertion into and to provide support for meat to be roasted within the housing interior. The universal joint 48 located between the end wall 16 and the support shaft accommodates any misalignment which may exist between the output shaft 46 and the support shaft.

A bearing 57 is attached to side wall 18 with the throughbore thereof in alignment with an aperture formed in that side wall. A stud shaft 58 is rotatable within and axially slidable relative to bearing 57. A collar 60 is secured to the stub shaft at the outer end thereof to keep the stud shaft from sliding completely into the interior of the housing. Likewise, a collar 62 prevents the stud shaft from falling out of the housing.

A recess 64 is defined by the stud shaft 58 at the innermost end thereof. Recess 64 is for the purpose of receiving projection 66 at the end of support shaft 54. A cotter pin 67 passes through aligned apertures formed in the stud shaft and projection 66 in order to interconnect the support shaft to the end wall 18 in rotatable fashion and retain the support shaft adjacent to the end wall 18 above the bottom wall.

The support shaft interconnect arrangement just described provides a very efficient expedient for loading and unloading the support shaft relative to the remainder of the barbecue apparatus. The preferred mode of loading the support shaft into place will be described in greater detail below.

Positioned between the support shaft 54 and bottom wall 14 is a charcoal rack 68. Charcoal rack 68 includes a frame 70 which is of rectangular shape and defines a plurality of receptacles, each of which releasably receives one of a plurality of charcoal holders 74. The charcoal holders each include a bottom grill element for retaining charcoal thereon. Ash from the charcoal is free to drop to the bottom of the housing through the holder bottoms.

When roasting a pig or other large quantity of meat it has been found that a more even distribution of heat to the meat may be obtained by removing the center-most charcoal holder; and of course, the removability feature just mentioned facilitates cleaning of the charcoal holders as well as replenishment thereof.

Figure 3:
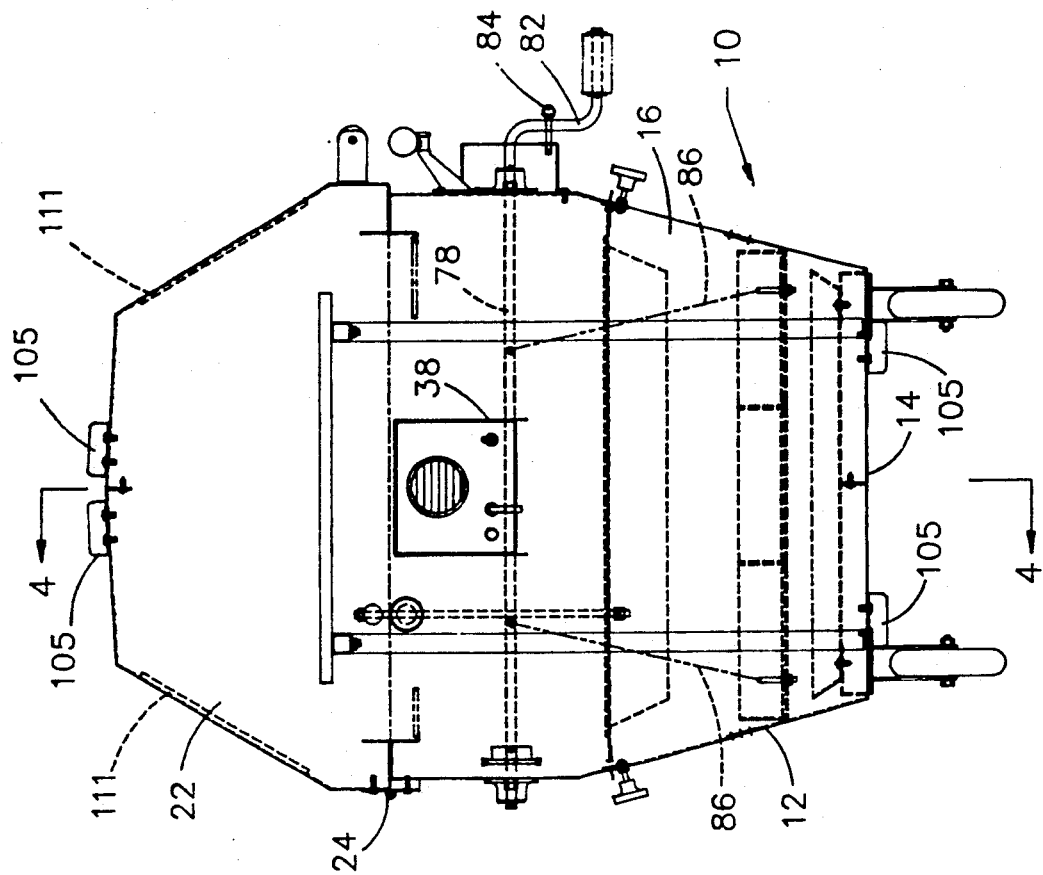
FIG. 3 is a somewhat diagrammatic, elevation end view of the apparatus illustrating one end thereof.
Figure 2:
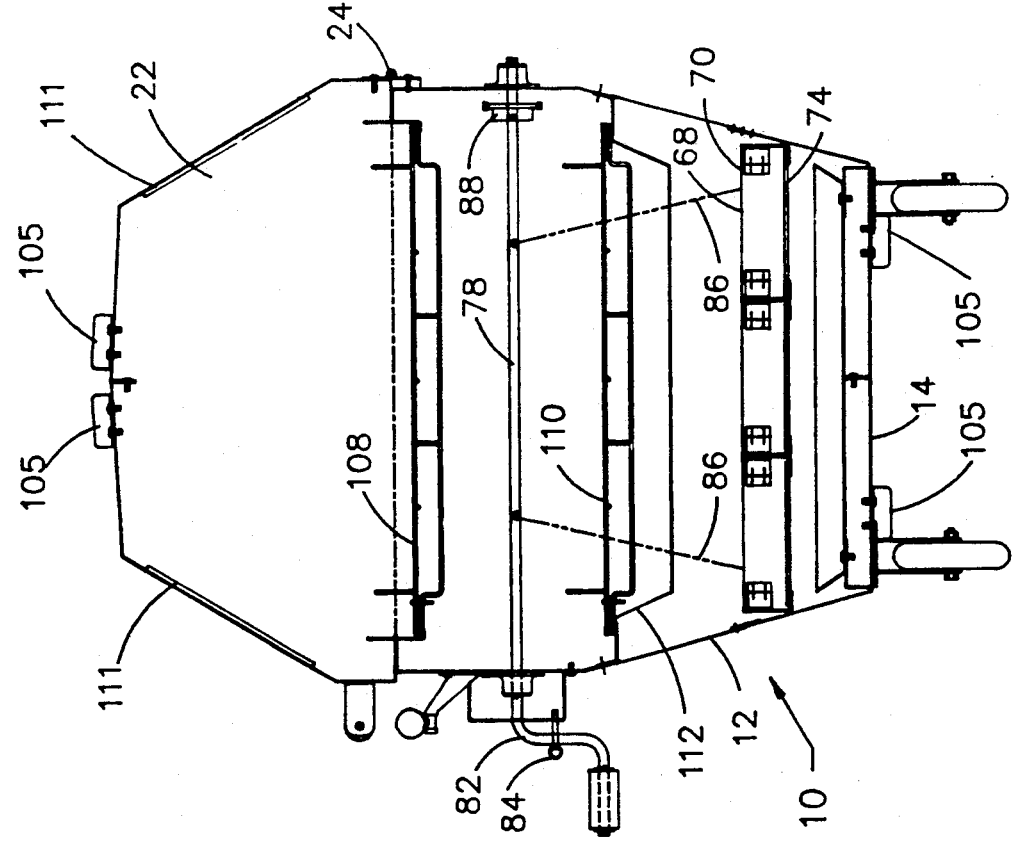
FIG. 2 is a somewhat diagrammatic, side elevation, cross-sectional view taken along line 2—2 of FIG. 1.
Figure 4:
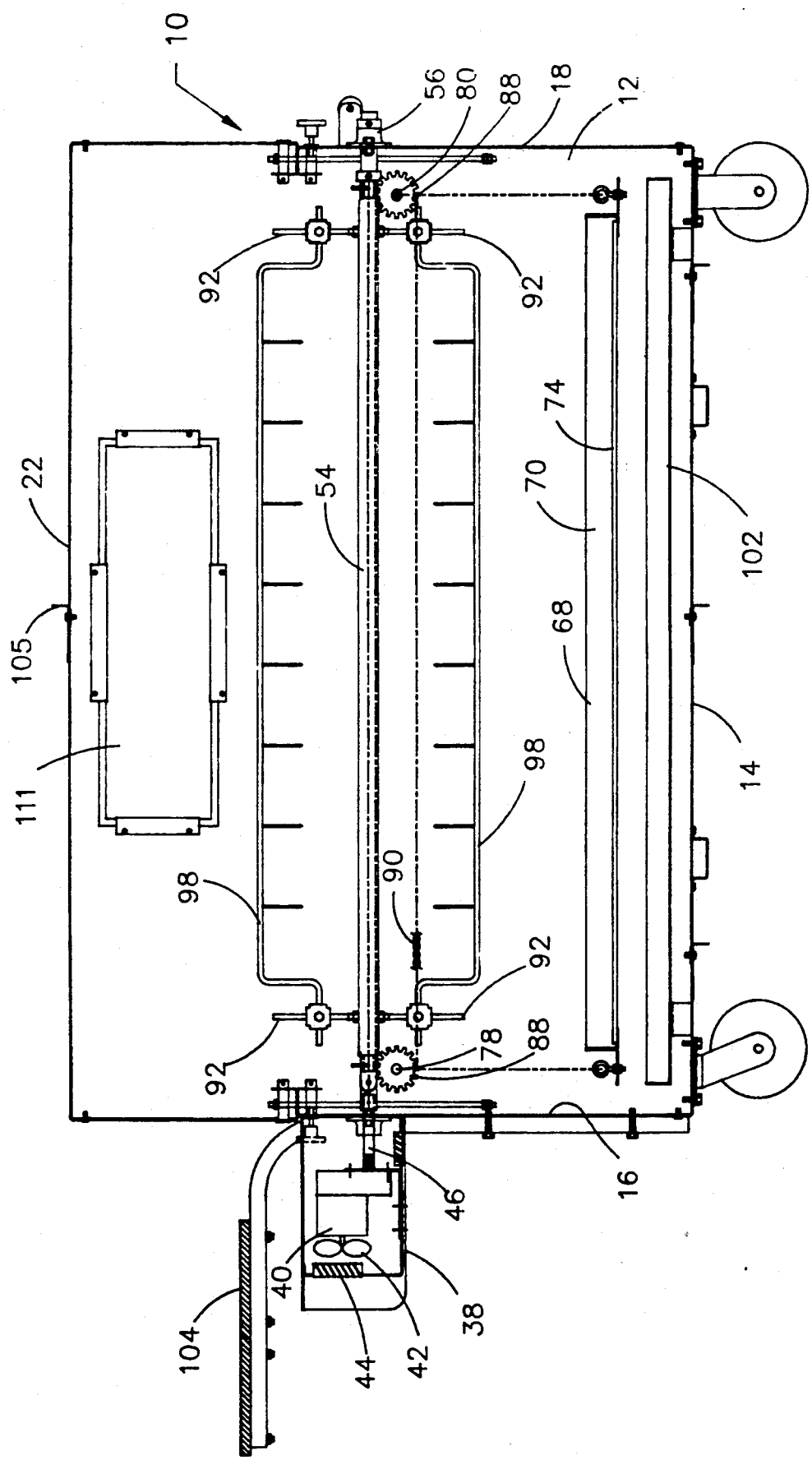
FIG. 4 is a somewhat diagrammatic, cross-sectional view taken along the line 4—4 in FIG. 3.
Figure 5:
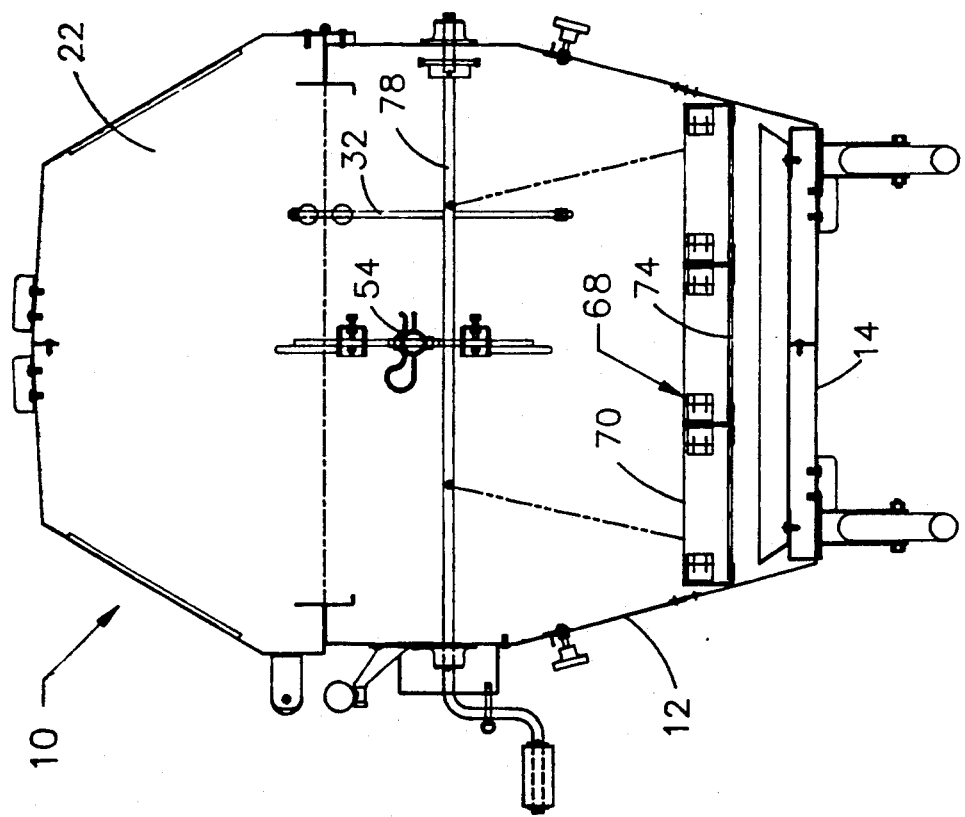
FIG. 5 is a view similar to FIG. 2 taken along the line 5—5 in FIG. 1.

Means is provided for moving the charcoal rack 68 relative to support shaft 54 and the bottom wall. The charcoal rack moving means includes a pair of spaced elongated rods 78, 80. The elongated rods 78, 80 are parallel to one another and extend between the front and rear walls of the housing near the upper extent thereof. Suitable bearing means is provided to rotatably support the elongated rods relative to the housing. One of the elongated rods, elongated rod 78, has a handle 82 affixed thereto whereby the operator may rotate elongated rod 78. As shown, for example, in FIGS. 2 and 3, a lock pin 84 is slidably mounted in handle 82 whereby the lock pin may be moved into locking position to prevent rotation of the handle by the operator pushing it inwardly and into a recess defined by the housing. FIGS. 2 and 3 show the lock pin 84 in its locking position.

Flexible chains or cables 86 extend from the elongated rods to the corners of the charcoal rack 68, and more particularly to the frame 70 thereof. Winding of the flexible cables about the elongated rods will, of course, raise the charcoal rack while unwinding thereof will lower the rack. It should be noted that a pair of cables 86 extends downwardly from each elongated rod to the charcoal rack and that the cables of each pair of cables continually diverge away from one another in a downward direction. That is, the cables of each pair of cables are closer together at their upper ends than at their lower ends. Such an arrangement prevents each cable from winding over itself at a single location relative to its associated elongated rod. In other words, the cable or chain wraps evenly in single layer fashion about the elongated rod in all instances, thus ensuring that the charcoal rack is raised uniformly by all the cables in the system.

The elongated rods 78, 80 are operatively connected together so that rotation of handle 82 will simultaneously rotate both elongated rods. In the arrangement illustrated, this is accomplished by means of gears 88 affixed to the elongated rods having a gear chain or belt 90 extending therebetween.

The apparatus, as shown, includes means for stabilizing meat relative to the support shaft 54. More particularly, pins 92 are affixed to and radiate outwardly from the support shaft 54 closely adjacent to the ends thereof. See, for example, FIGS. 8, 9 and 10. Clamps 94 define apertures receiving the pins 92, and set screws 96 of the clamps are utilized to secure the clamps at any desired position along pins 92.

Meat holder elements 98 extend along the length of the support shaft and have their ends affixed to the clamps 94. Meat piercing members 100 are positioned at spaced locations along the meat holder elements and extend inwardly toward the support shaft.

With the above-described arrangement, a pig or other large and heavy piece of meat can be quickly positioned relative to the housing and charcoal rack. First, the support shaft 54 is removed from the housing and inserted into the pig or other piece or pieces of meat to be roasted. Then, the meat holder elements are adjusted relative to the support shaft and meat and locked into position. Now the assemblage is positioned on and over elongated rods 78, 80. The stub shaft 58 is pulled inwardly relative to bearing 57 and projection 66 of the support shaft is inserted therein. Cotter pin 67 then locks these elements in position. Now the support shaft and stub shaft are pulled toward end wall 16 so that the projection 52 of the support shaft is located in the cooperating recess of universal joint 48.

Now the cotter pin 56 is manipulated so that it secures the support shaft and the universal joint together. The foregoing steps may be carried out quickly and with a minimum of effort.

Apparatus 10 incorporates a number of ancillary features which are also useful. For example, apparatus 10 includes an ash tray 102 disposed below the charcoal rack. A work table 104 may be affixed to the housing. Windows, such as window glass 111 in the cover, may be positioned to permit viewing of the housing interior at strategic locations, as may be vents, such as vent 105, to assure supply and movement of air within the housing. Referring to FIG. 2, grills 108, 110 may be selectively positioned with respect to the housing for conventional grilling. A pan 112 may be employed as a liquid flavor container for smoked grilling.

I claim:

1. Barbecue apparatus comprising, in combination:
   a housing defining an interior, said housing including a bottom wall and first and second opposed end walls projecting upwardly from said bottom wall;
   drive means including a motor having a rotatable output shaft mounted adjacent to said first end wall, said output shaft passing through an aperture formed in said first end wall;
   a support shaft having first and second ends, said support shaft extending over said bottom wall for insertion into and to provide support for meat over said bottom wall;
   first interconnect means for selectively releasably interconnecting said first support shaft end to said output shaft at a location within said housing above said bottom wall;
   second interconnect means for selectively releasably interconnecting said support shaft second end to said second end wall and retaining said support shaft adjacent to said second end wall above said bottom wall, said second interconnect means including a bearing mounted on said second end wall, a stud shaft rotatable within and axially slidable relative to said bearing and said support shaft to bring said stud shaft into operative engagement with said support shaft second end, and fastener means for selectively fastening together said support shaft second end and said stud shaft to allow joint rotation thereof.

2. The apparatus according to claim 1 additionally comprising a pillow block bearing affixed to said first end wall at the location of said aperture, said output shaft extending through said pillow block bearing and in engagement therewith to at least partially support said output shaft first end.

3. The apparatus according to claim 2 wherein said first interconnect means includes a universal joint for accommodating any misalignment between said output shaft and said support shaft.

4. The apparatus according to claim 3 wherein said first interconnect means includes fastener means for selectively releasably connecting said universal joint to said support shaft first end.

5. The apparatus according to claim 1 additionally comprising a charcoal rack disposed below said support shaft and above said bottom wall and means for moving said charcoal rack relative to said support shaft and said bottom wall, said charcoal rack moving means comprising a pair of spaced elongated rods disposed above said bottom wall and rotatably mounted relative to said housing, and a pair of flexible elements extending downwardly from each elongated rod to said charcoal rack, said flexible elements of each pair of flexible elements continually diverging away from one another in a downward direction.

6. The apparatus according to claim 5 additionally comprising transmission means interconnecting said elongated rods and handle means operatively connected to at least one of said elongated rods, said transmission means responsive to movement of said handle to effect simultaneous rotation of said elongated rods.

7. The apparatus according to claim 5 wherein said charcoal rack comprises a frame and a plurality of charcoal holders on said frame and movable therewith, at least one of said charcoal holders being selectively removable from said frame.

8. The apparatus according to claim 1 additionally comprising a cover connected to said housing and movable between a first position wherein said housing is substantially closed to a second position wherein said housing is substantially open and cover placement adjustment means cooperable with said housing, and said cover to lock said cover at said second position or at a plurality of selected positions between said first and second positions.

9. The apparatus according to claim 8 wherein said cover adjustment means comprises at least one elongated adjustment element interconnecting said cover and said housing and lock means for locking said cover, said housing and said elongated adjustment element against relative movement.

10. The apparatus according to claim 1 additionally comprising a plurality of meat holder elements attached to said support shaft, spaced from said support shaft and extending along substantially along the length of said support shaft, said meat holder elements being spaced from one another about the periphery of said support shaft, and means for adjusting the positions of said meat holder elements relative to said support shaft and meat supported by said support shaft.

11. The apparatus according to claim 10 additionally comprising meat piercing members attached to said meat holder elements and extending therefrom toward said support shaft.

12. The apparatus according to claim 10 wherein said means for adjusting the positions of said meat holder elements relative to said support shaft comprises pins radiating outwardly from said support shaft and affixed thereto and clamps affixed to said meat holder elements and selectively movable relative to said pins.

* * * * *